(12) United States Patent
Lim

(10) Patent No.: US 8,687,154 B2
(45) Date of Patent: Apr. 1, 2014

(54) IN-PLANE SWITCHING MODE LIQUID CRYSTAL DISPLAY DEVICE

(75) Inventor: Dong Hoon Lim, Seoul (KR)

(73) Assignee: Hydis Technologies Co., Ltd., Gyeonggi-do (KR)

(*) Notice: Subject to any disclaimer, the term of this patent is extended or adjusted under 35 U.S.C. 154(b) by 693 days.

(21) Appl. No.: 12/270,145

(22) Filed: Nov. 13, 2008

(65) Prior Publication Data

US 2009/0122240 A1    May 14, 2009

(30) Foreign Application Priority Data

Nov. 14, 2007 (KR) .................. 10-2007-0115929
Jul. 29, 2008 (KR) .................. 10-2008-0074196

(51) Int. Cl.
*G02F 1/1333* (2006.01)
*G02F 1/1343* (2006.01)

(52) U.S. Cl.
USPC .......................................... 349/111; 349/141

(58) Field of Classification Search
USPC ........................................ 349/106–111, 141
See application file for complete search history.

(56) References Cited

U.S. PATENT DOCUMENTS

| | | | |
|---|---|---|---|
| 6,587,170 B2 * | 7/2003 | Shin et al. ................. | 349/110 |
| 7,259,820 B2 | 8/2007 | Matsumoto | |
| 2002/0003597 A1 * | 1/2002 | Shin et al. ................. | 349/110 |
| 2002/0131003 A1 * | 9/2002 | Matsumoto ................. | 349/139 |
| 2005/0036087 A1 * | 2/2005 | Mai ................. | 349/110 |
| 2007/0070263 A1 * | 3/2007 | Nishimura et al. .......... | 349/58 |

FOREIGN PATENT DOCUMENTS

| | | |
|---|---|---|
| JP | 2002277889 A | 9/2002 |
| KR | 1019990044634 | 6/1999 |
| KR | 10-2002-0073447 A | 9/2002 |
| KR | 1020030057147 A | 7/2003 |
| KR | 1020070072134 A | 7/2007 |
| WO | 9710530 A1 | 3/1997 |

* cited by examiner

Primary Examiner — Jessica M Merlin
(74) Attorney, Agent, or Firm — The Webb Law Firm

(57) ABSTRACT

Disclosed is an in-plane switching mode liquid crystal display, in which a pixel electrode and a common electrode are formed on the same substrate. The display includes a first substrate having a first conductive layer and second conductive layer, the first conductive layer and second conductive layer formed on each surface of the first substrate; a second substrate has a transparent pixel electrode and a transparent common electrode formed on one surface of the second substrate, facing the second conductive layer; an electrical connection part is installed to electrically connect the second conductive layer to the transparent common electrode, wherein a common voltage applied to the transparent common electrode is applied to the second conductive layer through the electrical connection part. This arrangement prevents generation of static electricity to suppress a whitening phenomenon due to liquid crystal polarization in a liquid crystal layer, thereby improving display image quality.

5 Claims, 6 Drawing Sheets

IN-PLANE SWITCHING MODE LIQUID CRYSTAL DISPLAY DEVICE

BACKGROUND OF THE INVENTION

1. Field of the Invention

The present invention relates, in general, to an in-plane switching mode liquid crystal display device having a pixel electrode and a common electrode formed on the same substrate, and more particularly, to an in-plane switching mode liquid crystal display device capable of suppressing a liquid crystal polarization due to external static electricity to improve display image quality, by forming an induced electric field between a first conductive layer and a second conductive layer, to which a common voltage is applied through an electrical connection.

2. Description of the Related Art

In recent times, research on an in-plane switching mode (IPS) liquid crystal display (LCD) has been widely performed. The IPS LCD includes two electrodes formed on the same substrate such that a voltage is applied between the two electrodes to generate a horizontal electric field or a fringe electric field with respect to the substrate.

Hereinafter, the structure of a conventional IPS LCD will be described in brief with reference to the accompanying drawings.

FIG. 1 is a schematic cross-sectional view of a conventional IPS LCD.

Since the conventional IPS LCD shown in FIG. 1 includes a pixel array 22 having a pixel electrode and a common electrode and formed at one side of a lower substrate 20, when static electricity is generated from an upper substrate having no electrode, a liquid crystal polarization may be generated in a liquid crystal layer (LC, 40) due to static electricity, thereby deteriorating display image quality. In order to prevent occurrence of the liquid crystal polarization, a method of grounding static electricity introduced from the exterior through an SUS bezel 30 upon introduction of the static electricity by coating a transparent conductive layer 16 on a rear surface of the upper substrate 10, and connecting a copper tape 32 to the SUS bezel 30 surrounding a mold frame 29 has been used.

As described above, the transparent conductive layer 16 in contact with the SUS bezel 30 functions as a ground terminal to prevent the upper substrate 10 as a dielectric material from being charged upon introduction of external static electricity, thereby preventing intrusion of the electric field into a liquid crystal 40 due to the static electricity.

However, when the SUS bezel 30 is removed in order to form a small, lightweight and compact device such as a mobile or portable appliance, the transparent conductive layer 16 formed on the rear surface of the upper substrate 10 must be floated, making it impossible to perfectly shield the static electricity.

SUMMARY OF THE INVENTION

Accordingly, the present invention has been made keeping in mind the above problems occurring in the related art, and an object of the present invention is to provide an in-plane switching mode liquid crystal display capable of suppressing a liquid crystal polarization due to external static electricity to improve display image quality.

In order to achieve the above object, according to one aspect of the present invention, there is provided an in-plane switching mode liquid crystal display comprising: a first substrate having a first conductive layer and second conductive layer, the first conductive layer and second conductive layer formed on each surface of the first substrate; a second substrate having a transparent pixel electrode and a transparent common electrode formed on one surface of the second substrate, facing the second conductive layer; an electrical connection part is installed to electrically connect the second conductive layer to the transparent common electrode, wherein a common voltage applied to the transparent common electrode is applied to the second conductive layer through the electrical connection part.

According to another aspect of the present invention, there is provided an in-plane switching mode liquid crystal display comprising: a first substrate having a first conductive layer, second conductive layer, and an insulating layer between the first conductive layer and second conductive layer; a second substrate having a transparent pixel electrode and a transparent common electrode formed on one surface of the second substrate, facing the second conductive layer; an electrical connection part is installed to electrically connect the second conductive layer to the transparent common electrode, wherein a common voltage applied to the transparent common electrode is applied to the second conductive layer through the electrical connection part.

The insulating layer may be over coater layer for improving planarization.

The color filter layer may be formed on the first substrate, including color filter patterns and the second conductive layer mat be patterned conductive light-shielding layer formed between the color filter patterns.

The first conductive layer may be patterned in a shape corresponding to the light-shielding layer.

The color filter layer may be further formed on the first substrate including color filter patterns and a conductive light-shielding layer formed between the color filter patterns, and wherein the second conductive layer is patterned in a shape corresponding to the conductive light-shielding layer.

The first conductive layer may be replaced with a conductive polarizer.

Preferably, the in-plane switching mode liquid crystal display further comprises a conductive polarizer on the first conductive layer.

The first conductive layer may be formed of a metal material or a conductive resin.

The first conductive layer may be totally formed of a transparent metal material or a transparent conductive resin.

Preferably, the in-plane switching mode liquid crystal display further comprises a color filter layer formed on the first substrate, including color filter patterns and a light-shielding layer including color filter patterns.

Preferably, the in-plane switching mode liquid crystal display further comprises an overcoat layer between the first conductive layer and the second conductive layer.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 1:
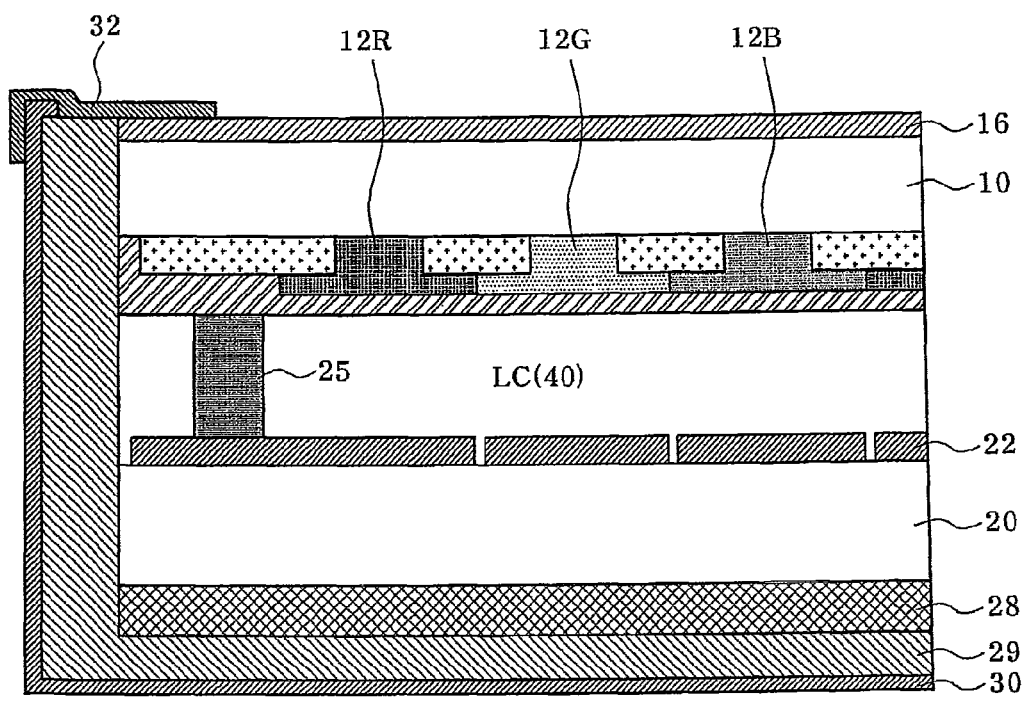
FIG. 1 is a schematic cross-sectional view of a conventional in-plane switching mode liquid crystal display.
Figure 2A:
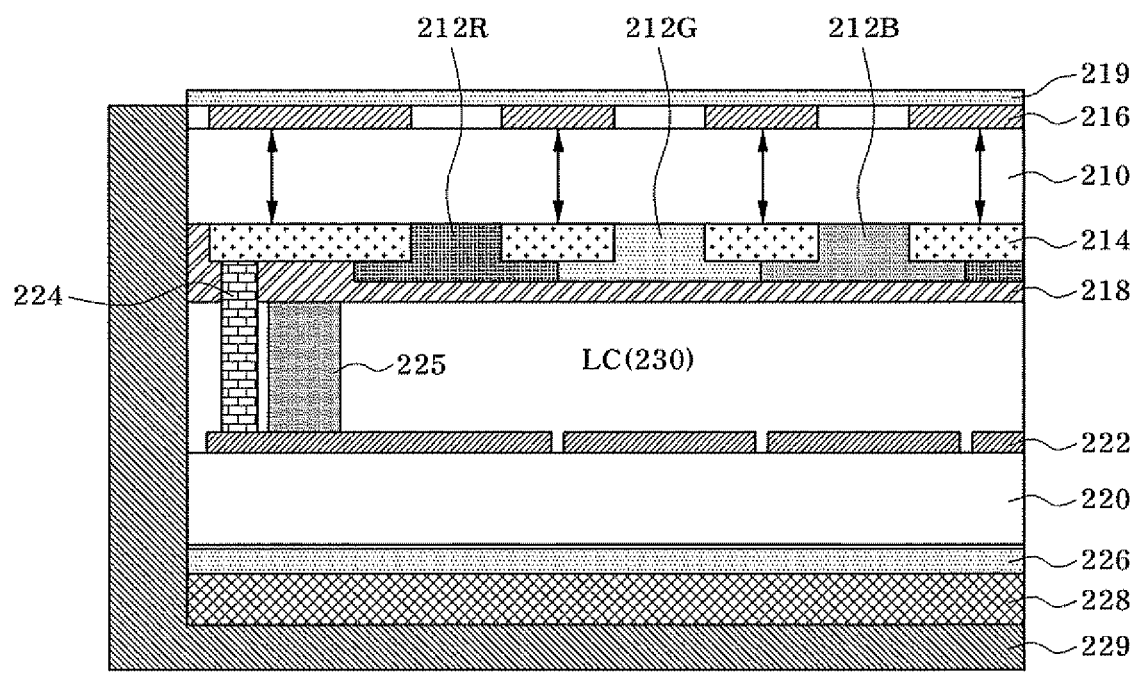
FIG. 2A is a schematic cross-sectional view of an in-plane switching mode liquid crystal display in accordance with an exemplary embodiment of the present invention.
Figure 2B:
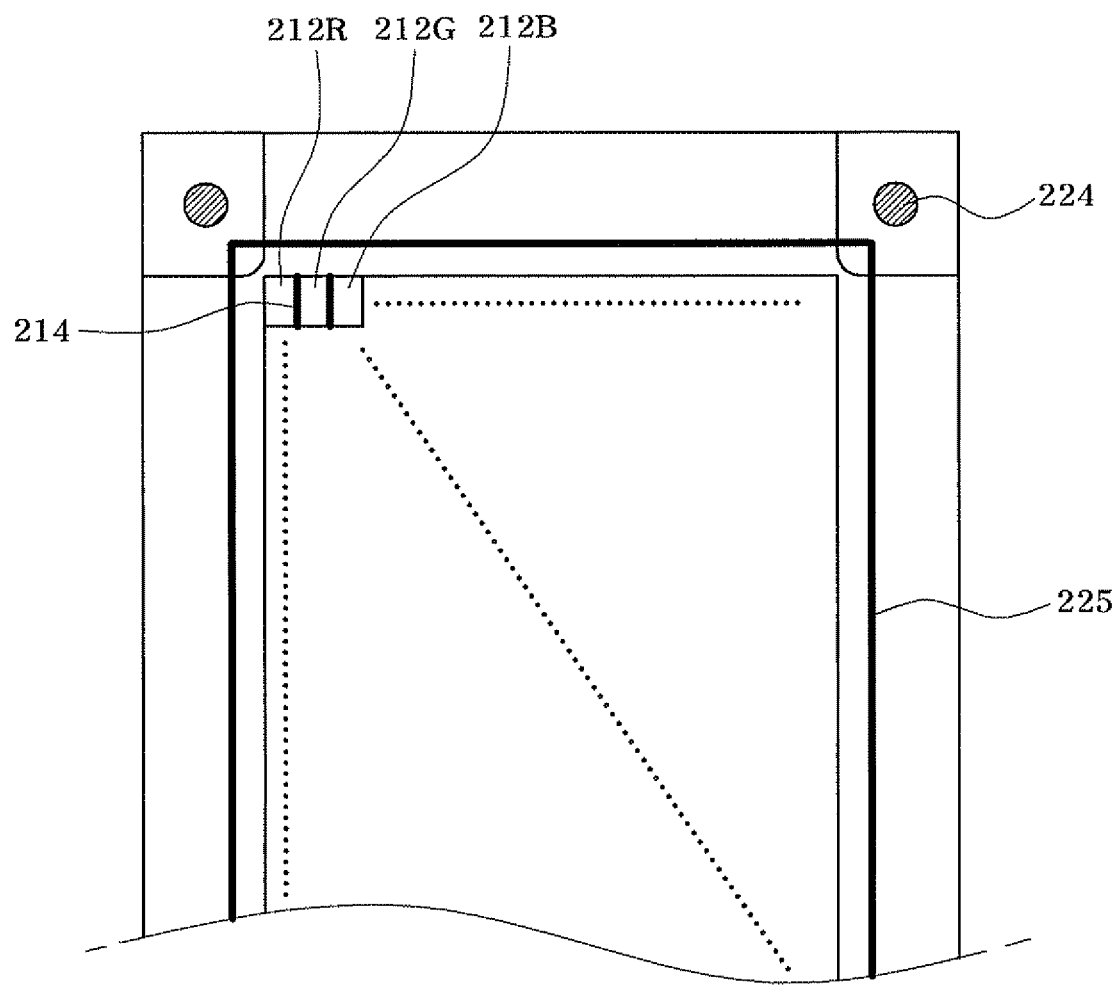
FIG. 2B is a plan view of an in-plane switching mode liquid crystal display including a transfer dotting part of FIG. 2A.

FIG. 2A is a schematic cross-sectional view of an in-plane switching mode liquid crystal display in accordance with an exemplary embodiment of the present invention, and FIG. 2B is a plan view of an in-plane switching mode liquid crystal display including a transfer dotting part of FIG. 2A.

Hereinafter, the in-plane switching mode liquid crystal display in accordance with an exemplary embodiment of the present invention will be described with reference to FIGS. 2A and 2B.

The in-plane switching mode liquid crystal display in accordance with an exemplary embodiment of the present invention includes a first substrate 210, color filter layers 212R, 212G, and 212B, a conductive light-shielding layer 214, a conductive layer 216, a second substrate 220, a pixel array 222 including a transparent pixel electrode and a transparent common electrode, and an electrical connection part 224.

The conductive layer 216 is formed on one surface of the first substrate 210. When the conductive layer 216 is formed on the entire one surface of the first substrate 210, the conductive layer 216 may be formed of a transparent conductive resin or a transparent conductive metal material such as indium tin oxide (ITO) or indium zinc oxide (IZO) having relatively good light transmissivity. In addition, when the conductive layer 216 is patterned on one surface of the first substrate 210 to correspond to the conductive light-shielding layer 214, the conductive layer 216 may be formed of metal material and conductive resin of all types including the transparent conductive resin and the transparent conductive metal material. Here, the transparent conductive resin may be formed of a mixture of indium tin oxide powder and acryl (ITO powder +acryl), epoxy, or the like.

An upper conductive polarizer 219 may be formed on the conductive layer 216. Otherwise, the upper conductive polarizer 219 may be formed on the first substrate 210 without the conductive layer 216.

The conductive light-shielding layer, i.e., black matrices 214 function to prevent light leakage, and may include chrome (Cr). The conductive light-shielding layer 214 is formed on the other surface of the first substrate 210 at predetermined intervals to generally divide the color filter layers 212R, 212G and 212B of red, green and blue.

The color filter layers 212R, 212G and 212B, generally formed of a photosensitive organic material, are alternately arranged in sequence of red, green and blue color filter patterns between the conductive light-shielding layers 214. Meanwhile, an overcoat layer 218 may be selectively formed under the color filter layers 212R, 212G and 212B to remove a step difference generated by the color filter layers 212R, 212G and 212B and improve planarity.

A pixel array 222 including a transparent pixel electrode and a transparent common electrode is formed on one surface of the second substrate 220. While not specifically shown, each pixel region is defined by gate lines and data lines formed to intersect each other. Switching devices are disposed at the intersection of the gate lines and the data lines. The pixel electrode and the transparent common electrode are spaced apart from each other to overlap a predetermined region, with an insulating layer interposed therebetween, and are disposed in the pixel region in order to apply a voltage to a liquid crystal layer 230 to thereby adjust light transmissivity.

The electrical connection part 224 is electrically connected to the conductive light-shielding layer 214 and the transparent common electrode of the pixel array 222, and includes a transfer dotting part including a metal having high conductivity, preferably, silver (Ag), or a conductive sealing member including gold (Au).

When a common voltage is applied to the transparent common electrode of the pixel array 222, the common voltage is applied to the conductive light-shielding layer 214 through the electrical connection part 224 to form an induced electric field between the conductive light-shielding layer 214 and the conductive layer 216, thereby preventing external static electricity from affecting the liquid crystal layer 230. That is, as bi-directional arrows shown in a vertical direction of the first substrate 210 of FIG. 2A, the induced electric field is formed between the conductive layer 216 and the conductive light-shielding layer 214 to prevent occurrence of a liquid crystal polarization in the liquid crystal layer 230.

In FIG. 2A, reference numeral 225 designates a sealing member, reference numeral 226 designates a lower polarizer, reference numeral 228 designates a back light unit, and reference numeral 229 designates a mold frame.

When the electrical connection part 224 is a transfer dotting part, as shown in FIG. 2B, the transfer dotting part 224 may be formed outside the sealing member 225 surrounding the pixel region.

Here, when the conductive layer 216 is replaced with only the upper conductive polarizer 219, the induced electric field is formed between the upper conductive polarizer 219 and the conductive light-shielding layer 214.

Figure 3:
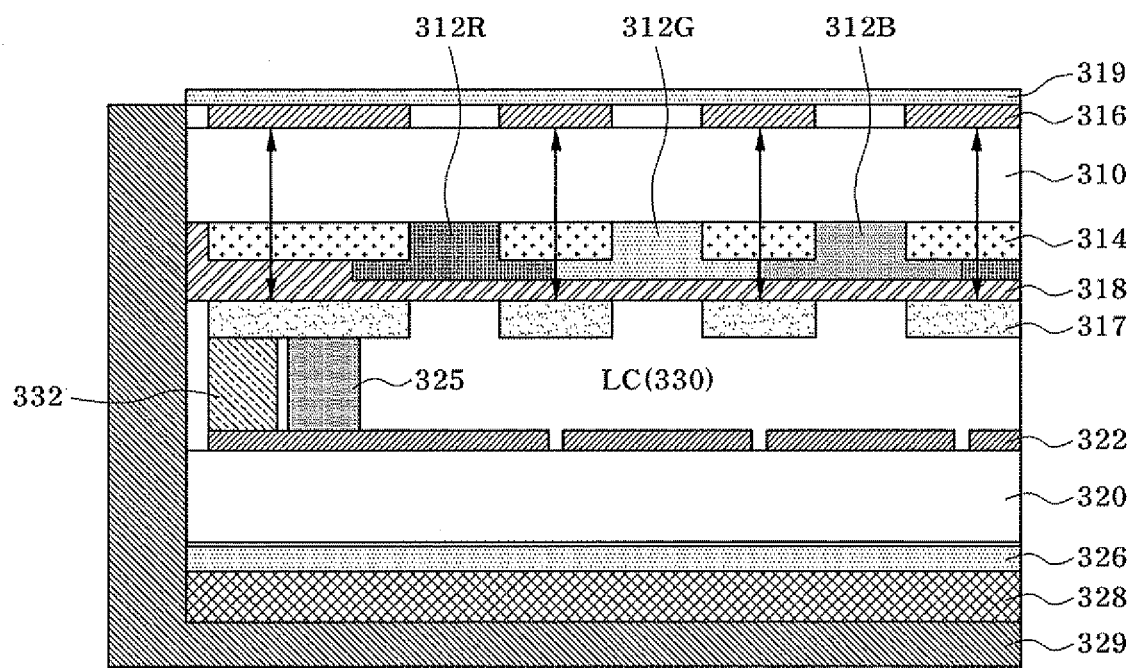
FIG. 3 is a schematic cross-sectional view of an in-plane switching mode liquid crystal display in accordance with another exemplary embodiment of the present invention.

FIG. 3 is a schematic cross-sectional view of an in-plane switching mode liquid crystal display in accordance with another exemplary embodiment of the present invention.

Referring to FIG. 3, the in-plane switching mode liquid crystal display in accordance with an exemplary embodiment of the present invention includes a first substrate 310, color filter layers 312R, 312G, and 312B, a light-shielding layer 314, a first conductive layer 316, a second conductive layer 317, a second substrate 320, a pixel array 322 including a transparent pixel electrode and a transparent common electrode, and an electrical connection part 332.

The conductive layer 316 is formed on one surface of the first substrate 310. When the conductive layer 316 is formed on the entire one surface of the first substrate 310, the conductive layer 316 may be formed of a transparent conductive resin or a transparent conductive metal material such as indium tin oxide (ITO) or indium zinc oxide (IZO) having relatively good light transmissivity. In addition, when the conductive layer 316 is patterned on one surface of the first substrate 310 to correspond to the light-shielding layer 314, the conductive layer 216 may be formed of metal material and conductive resin of all types including the transparent conductive resin and the transparent conductive metal material. Here, the transparent conductive resin may be formed of a mixture of indium tin oxide powder and acryl (ITO powder +acryl), epoxy, or the like.

An upper conductive polarizer 319 may be formed on the first transparent conductive layer 316. On the other hand, the upper conductive polarizer 319 may be formed on the first substrate 310, without the first transparent conductive layer 316.

The light-shielding layer 314 functions to prevent light leakage, and may include resin. The light-shielding layer 314 formed of resin can implement clear display even in an outdoor environment because the light-shielding layer 314 does not reflect external incident light. In addition, a reddish coloring problem generated by the internal reflection upon implementation of ultra-high brightness can be readily solved, and design of the liquid crystal display and a manufacturing process thereof can be simplified.

The light-shielding layers 314 are formed on the other surface of the first substrate 310 at predetermined intervals, lo and generally divide the red, green and blue color filter layers 312R, 312G and 312B.

The color filter layers 312R, 312G and 312B, generally formed of a photosensitive organic material, are alternately arranged in sequence of red, green and blue color filter patterns between the light-shielding layers 314.

The second conductive layer 317 substantially patterned under the light-shielding layer 314 in a shape corresponding to the light-shielding layer 314.

Meanwhile, an overcoat layer 318 may be selectively formed under the color filter layers 312R, 312G and 312B to remove a step difference generated by the color filter layers 312R, 312G and 312B and improve planarity. This case, the second conductive layer 317 may be formed under the overcoat layer 318. Here, the overcoat layer 318 may include a thermosetting material.

The second conductive layer 317 may be formed between the second substrate 320 and the light-shielding layer 314. This case, the second conductive layer 317 is patterned in a shape corresponding to the light-shielding layer 314 or on the entire of the second substrate 320.

The pixel array 322 including a transparent pixel electrode and a transparent common electrode is formed on one surface of the second substrate 320. Meanwhile, each pixel region is defined by gate lines and data lines formed to intersect each other. Switching devices are disposed at the intersection of the gate lines and the data lines (not shown). The pixel electrode and the transparent common electrode are spaced apart from each other to overlap a predetermined region, with an insulating layer (not shown) interposed therebetween, and are disposed in the pixel region in order to apply a voltage to a liquid crystal layer 330 to thereby adjust light transmissivity.

The electrical connection part 332 is electrically connected to the second conductive layer 317 and the transparent common electrode of the pixel array 322, and includes a transfer dotting part including a metal having high conductivity, preferably, silver (Ag), or a conductive sealing member including gold (Au).

When a common voltage is applied to the transparent common electrode of the pixel array 322, the common voltage is applied to the second conductive layer 317 through the electrical connection part 332 to form an induced electric field between the second conductive layer 317 and the first conductive layer 316, thereby preventing external static electricity from affecting the liquid crystal layer 330. That is, as shown by arrows, the induced electric field is formed between the first conductive layer 316 and the second conductive layer 317 to prevent occurrence of a liquid crystal polarization in the liquid crystal layer 330.

Meanwhile, as shown in FIG. 3, the IPS LCD further includes a sealing member 325, a lower polarizer 326, a back light unit 328, and a mold frame 329.

Here, when the first conductive layer 316 is replaced with the upper conductive polarizer 319, an induced electric field is formed between the upper conductive polarizer 319 and the second conductive layer 317.

Meanwhile, since basic components of the LCD, which are not specifically described, for example, a thin film transistor, a substrate, a liquid crystal layer, and so on, are the same as in the conventional LCD, detailed descriptions thereof will be omitted.

Figure 4:
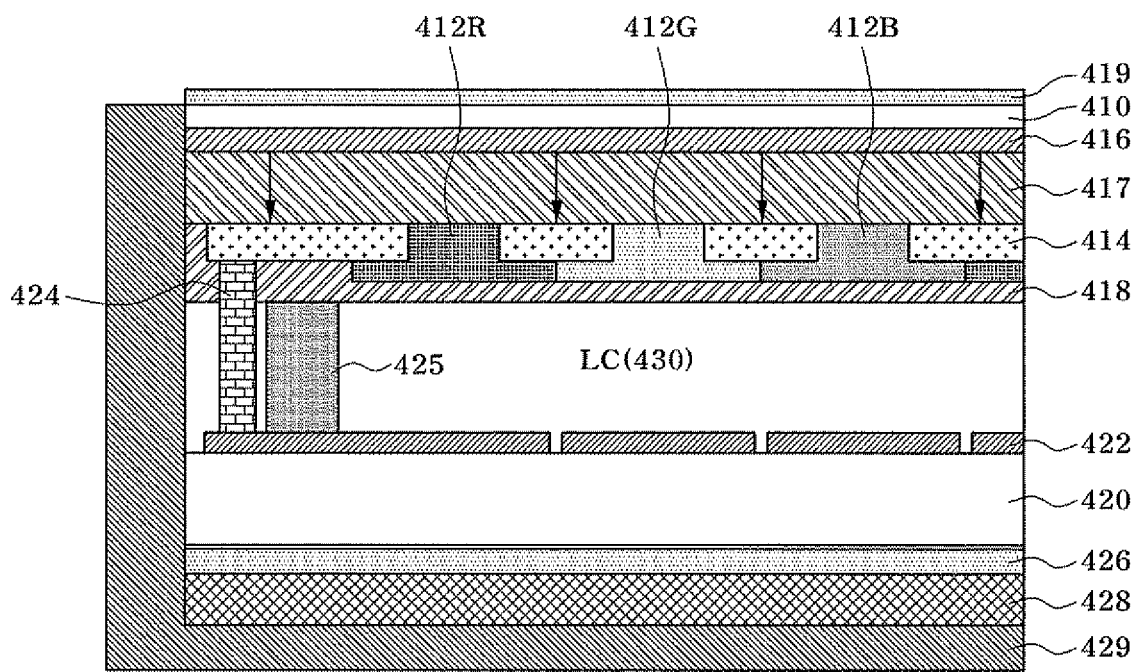
FIG. 4 is a schematic cross-sectional view of an in-plane switching mode LCD device according to still another exemplary embodiment of the present invention.

FIG. 4 is a schematic cross-sectional view of an in-plane switching mode LCD device according to still another exemplary embodiment of the present invention.

Referring to FIG. 4, the in-plane switching mode LCD device according to this exemplary embodiment will be described.

The in-plane switching mode LCD device according to this exemplary embodiment includes a first substrate 410, color filter layers 412R, 412G, and 412B, a conductive light-shielding layer 414, a conductive layer 416, a first overcoat layer 417, a second substrate 420, a pixel array 422 including a transparent pixel electrode and a transparent common electrode, and an electrical connection part 424.

The conductive layer 416 is formed between the first substrate 410 and a first overcoat layer 417. When the conductive layer 416 is formed on the entire lower surface of the first substrate 410, the conductive layer 416 may be formed of a transparent conductive resin or a transparent conductive metal material such as ITO or IZO having relatively excellent light transmissivity. Further, when the conductive layer 416 is formed under the first substrate 410 and patterned to correspond to the conductive light-shielding layer 414, the conductive layer 416 may be formed of metal material and conductive resin of all types including the transparent conductive resin and the transparent conductive metal material.

The transparent conductive resin may be composed of a mixture (ITO Powder +Acryl) of ITO powder and acryl or epoxy. Further, an upper conductive polarizer 419 may be formed on the first substrate 410.

The conductive light-shielding layer 414 serves to prevent light leakage, and may include Cr. The conductive light-shielding layers 414 are formed under the first overcoat layer 417 to be spaced a predetermined distance from each other. In general, the conductive light-shielding layer 414 divide the red, green, and blue color filter layers 412R, 412G, and 4123.

The filter layers 412R, 412G, and 4123, formed of a photosensitive organic material, are alternately arranged in sequence of red, green, and blue color filter patterns between the respective conductive light-shielding layers 414. Meanwhile, the second overcoat layers 418 may be selectively formed under the color filter layers 412R, 412G, and 412B so as to remove a step difference formed by the color filter layers 412R, 412G, and 412B and improve planarity.

The pixel array 422 including a pixel electrode and a transparent common electrode is formed on one surface of the second substrate 420. Meanwhile, although not shown, the respective pixel regions are defined by gate lines and data lines formed in directions crossing each other, and switching devices are formed at intersections of the gate lines and the data lines. Further, the pixel electrode and the transparent common electrode are spaced apart from each other to overlap a predetermined region, with an insulating layer interposed therebetween, and are formed in the pixel region in order to apply a voltage to a liquid crystal layer 430 to thereby adjust light transmissivity.

The electrical connection part 424 is electrically connected to the conductive light-shielding layer 414 and the transparent common electrode of the pixel array 422. The electrical connection part 424 includes a transfer dotting part including a metal having high conductivity, preferably, silver (Ag), or a conductive sealing member including gold (Au).

When a common voltage is applied to the transparent common electrode of the pixel array 422, the common voltage is applied lo to the conductive light-shielding layer 414 through the electrical connection part 424 so as to form an induced electric field between the conductive light-shielding layer 414 and the conductive layer 416, thereby preventing external static electricity from affecting the LC layer 430. That is, as indicated by arrows which are represented in the first overcoat layer 417, the induced electric field is formed between the conductive layer 416 and the conductive light-shielding layer 414, thereby preventing liquid crystal polarization from occurring in the liquid crystal layer.

In FIG. 4, reference numerals 425, 426, 428, and 429 represent a sealing member, a lower polarizer, a backlight unit, and a mold frame, respectively.

Figure 5:
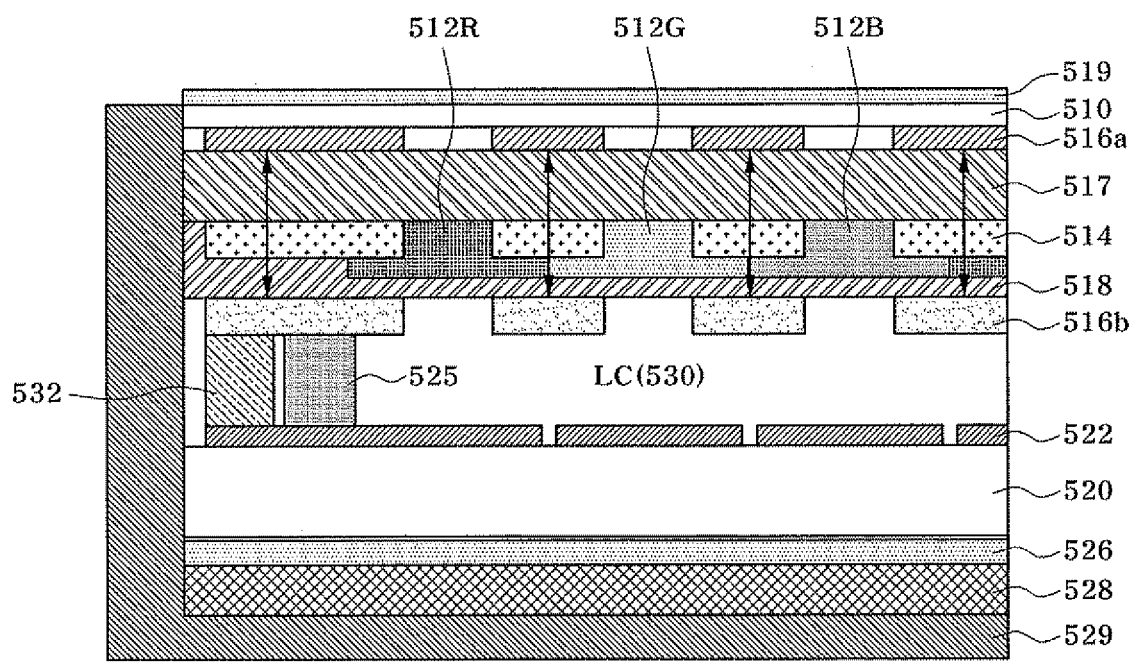
FIG. 5 is a schematic cross-sectional view of an in-plane switching mode LCD device according to still another exemplary embodiment of the present invention.

FIG. 5 is a schematic cross-sectional view of an in-plane switching mode LCD device according to still another exemplary embodiment of the present invention.

Referring to FIG. 5, the in-plane switching mode liquid crystal display in accordance with an exemplary embodiment of the present invention includes includes a first substrate 510, color filter layers 512R, 512G, and 512B, a light-shielding layer 514, a first conductive layer 516a, a second conductive layer 516b, a second substrate 520, a pixel array 522 including a transparent pixel electrode and a transparent common electrode, and an electrical connection part 532.

The first conductive layer 516a is formed under the first substrate 510. When the conductive layer 516a is formed on the entire on one surface of the first substrate 510, the first conductive layer 516a may be formed of a transparent conductive resin or a transparent conductive metal material such as ITO or IZO having relatively excellent light transmissivity. Further, when the first conductive layer 516a is formed under the first substrate 510 and patterned to correspond to the light-shielding layer 514, the first conductive layer 516a may be formed of metal material and conductive resin of all types including the transparent conductive resin and the transparent conductive metal material. The transparent conductive resin may be composed of a mixture (ITO Powder+Acryl) of ITO powder and acryl or epoxy. Further, an conductive polarizer 519 may be formed on the first substrate 510.

The light-shielding layers 514 are formed under the first conductive layer 516a to be spaced a predetermined distance from each other. In general, the light-shielding layer 514 divide the red, green, and blue color filter layers 512R, 512G, and 512B.

The filter layers 512R, 512G, and 512B, formed of a photosensitive organic material, are alternately arranged in sequence of red, green, and blue color filter patterns between the respective light-shielding layers 514. Meanwhile, the first overcoat layers 517 may be selectively formed between the first conductive layer 516a, the color filter layers 512R, 512G, and 512B and the light-shielding layer 514.

The second conductive layer 516b substantially patterned under the light-shielding layer 514 in a shape corresponding to the light-shielding layer 514.

Meanwhile, an overcoat layer 518 may be selectively formed under the color filter layers 512R, 512G and 512B to remove a step difference generated by the color filter layers 512R, 512G and 512B and improve planarity. The second conductive layer 516b may be formed under the overcoat layer 518.

The second conductive layer 516b may be formed between the first overcoat layer 517 and the light-shielding layer 514. The second conductive layer 516b may be formed on the entire upper one surface of the first overcoat layer 517.

The pixel array 522 including a transparent pixel electrode and a transparent common electrode is formed on one surface of the second substrate 520. Meanwhile, although not shown, the respective pixel regions are defined by gate lines and data lines formed in directions crossing each other, and switching devices are formed at intersections of the gate lines and the data lines. Further, the pixel electrode and the transparent common electrode are spaced apart from each other to overlap a predetermined region, with an insulating layer interposed therebetween, and are formed in the pixel region in order to apply a voltage to a liquid crystal layer 530 to thereby adjust light transmissivity.

The electrical connection part 532 is electrically connected to the second conductive layer 516b and the transparent common electrode of the pixel array 522. The electrical connection part 532 includes a transfer dotting part including a metal having high conductivity, preferably, silver (Ag), or a conductive sealing member including gold (Au).

When a common voltage is applied to the transparent common electrode of the pixel array 522, the common voltage is applied to the second conductive layer 516b through the electrical connection part 532 so as to form an induced electric field between the first conductive layer 516a and the second conductive layer 516b, thereby preventing external static electricity from affecting the LC layer 530. That is, as indicated by arrows which are represented, the induced electric field is formed between the first conductive layer 516a and the second conductive layer 516b, thereby preventing liquid crystal polarization from occurring in the liquid crystal layer.

Meanwhile, as shown in FIG. 5, the IPS LCD further includes a sealing member 525, a lower polarizer 526, a back light unit 528, and a mold frame 529.

In addition, although the exemplary embodiments of the IPS LCD of the present invention have been described, not being limited thereto, the present invention may be adapted to all LCDs using optical anisotropy and polarizing characteristics of liquid crystal.

As can be seen from the foregoing, a common electric potential is applied to a conductive light-shielding layer formed on the other side of a first substrate through an electrical connection part to form an induced electric field with respect to a conductive layer formed on one side of the first substrate, thereby suppressing a liquid crystal polarization due to external static electricity to improve display image quality.

Further, according to the present invention, a common potential is applied to a second conductive layer formed on the other surface of the first substrate through an electrical connection part to form an induced electric field with respect to a first conductive layer formed on one side of the first substrate, thereby suppressing a liquid crystal polarization due to external static electricity to improve display image quality.

Although exemplary embodiments of the present invention have been described for illustrative purposes, not being limited thereto, those skilled in the art will appreciate that various modifications, additions and substitutions are possible, without departing from the scope and spirit of the invention as disclosed in the accompanying claims.

What is claimed is:

1. An in-plane switching mode liquid crystal display comprising:
   a first substrate having a first conductive layer formed on an entire surface thereof, an insulating layer formed on a surface of the first conductive layer, and a second conductive layer formed on a surface of the insulating layer, the second conductive layer is a patterned conductive light-shielding layer;
   a color filter layer formed on the surface of the insulating layer, the color filter layer comprising color filter patterns formed between the patterned conductive light-shielding layer of the second conductive layer;
   a second substrate having a transparent pixel electrode and a transparent common electrode formed on one surface of the second substrate, facing the second conductive layer; and
   an electrical connection part installed to electrically connect the second conductive layer to the transparent common electrode,
   wherein a common voltage applied to the transparent common electrode is applied to the second conductive layer through the electrical connection part, and
   wherein, in a direction from the first substrate to the second substrate, the first conductive layer, the insulating layer and the second conductive layer and color filter layer are sequentially stacked and the insulating layer is between the first conductive layer and the second conductive layer.

2. The in-plane switching mode liquid crystal display according to claim 1, wherein the insulating layer is an over coater layer for improving planarization.

3. The in-plane switching mode liquid crystal display according to claim 1, further comprising a conductive polarizer on the first substrate.

4. The in-plane switching mode liquid crystal display according to claim 1, wherein the first conductive layer and the second conductive layer are formed of a metal material or a conductive resin.

5. The in-plane switching mode liquid crystal display according to claim 1, wherein the first conductive layer and the second conductive layer are totally formed of a transparent metal material or a transparent conductive resin.

* * * * *